(12) United States Patent
Kamble et al.

(10) Patent No.: US 10,865,826 B1
(45) Date of Patent: Dec. 15, 2020

(54) THRUST BEARING ASSEMBLY FOR ENGINE CRANKCASE

(71) Applicant: Transportation IP Holdings, LLC, Norwalk, CT (US)

(72) Inventors: Sandeep Namadev Kamble, Bangalore (IN); Samir Vikas Joshi, Bangalore (IN)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 16/534,997

(22) Filed: Aug. 7, 2019

(51) Int. Cl.
*F16C 9/02* (2006.01)
*F16C 17/04* (2006.01)

(52) U.S. Cl.
CPC .............. *F16C 9/02* (2013.01); *F16C 17/045* (2013.01)

(58) Field of Classification Search
CPC .. F16C 9/02; F16C 9/04; F16C 17/022; F16C 17/045; F16C 33/046; F16C 2226/76; F16C 2360/22; F16C 17/04; F16C 33/107
See application file for complete search history.

(56) References Cited

U.S. PATENT DOCUMENTS

| | | | | |
|---|---|---|---|---|
| 2,594,587 A | * | 4/1952 | Riordan | F16C 33/14 384/281 |
| 3,713,714 A | * | 1/1973 | Hill | F16C 17/10 384/294 |
| RE32,764 E | * | 10/1988 | Smith | F16C 17/10 384/275 |
| 5,114,246 A | * | 5/1992 | Gowan | F16C 17/10 384/275 |
| 7,134,793 B2 | * | 11/2006 | Thompson | F16C 9/02 384/294 |
| 8,974,121 B1 | * | 3/2015 | Rudolph | F16C 17/04 384/420 |
| 9,863,466 B2 | * | 1/2018 | Tsuboi | F16C 43/02 |
| 2017/0002766 A1 | * | 1/2017 | Demeulenaere | F16C 9/02 |
| 2017/0051782 A1 | * | 2/2017 | Jones | F16C 43/02 |

OTHER PUBLICATIONS

Kamble, S. et al., "An Ornamental Design for a Bearing Apparatus," U.S. Appl. No. 29/701,027, filed Aug. 7, 2019, 9 pages.

* cited by examiner

Primary Examiner — Phillip A Johnson
(74) Attorney, Agent, or Firm — McCoy Russell LLP

(57) ABSTRACT

Methods and systems are provided for a thrust bearing assembly for a crankcase of an engine. In one example, a thrust bearing may comprise a semicircular curved plate mounted on a main bearing. At least two holes may be asymmetrically positioned on the surface of the thrust bearing to allow attachment with a flywheel housing in a unique manner.

20 Claims, 6 Drawing Sheets

THRUST BEARING ASSEMBLY FOR ENGINE CRANKCASE

FIELD

Embodiments relate to engine systems. Other embodiments relate to thrust bearing assemblies for engine crankcases.

BACKGROUND

Crankshafts are journaled in engine blocks by a series of axially spaced engine bearing assemblies. These assemblies include one or more rotary bearings that permit rotation of the crankshaft while supporting an axial load of the crankshaft. For example, the crankshaft includes a thrust bearing that provides a fore/aft gap-control for axial movement (also known as endplay) of the crankshaft. The thrust bearing is typically located at a terminal location, such as at a back end of an engine block, where a crankcase cover meets the crankshaft.

Incorrect assembly and mounting of the thrust bearing assembly during engine manufacture can result in premature engine degradation. For example, if the thrust bearing is mounted with the opposite side (than intended) facing the crankshaft, the crank surface may be affected under conditions of high thrust loading, especially during buff or coupling events, as well as during dynamic operation. If the thrust bearing is mounted using a grub screw and a counter sunk, the thrust bearing may need to be thicker than desired, resulting in additional weight and manufacturing cost. If the thrust bearing is made thinner, as desired, the grub screw surface may damage the thrust surface.

BRIEF DESCRIPTION OF THE INVENTION

Methods and systems are provided for enabling reliable mounting of a crankcase thrust bearing assembly. In one embodiment, a thrust bearing assembly includes an arcuate plate having a concave inner edge and a convex outer edge extending radially from the inner edge to form a thrust surface, at least two holes in the plate positioned asymmetrically with reference to a central axis of the arcuate plate, a plurality of parallel grooves formed on one face of the arcuate plate. For example, in an embodiment, positions of the holes and parallel grooves are selected/configured, e.g., relative to one another and/or to first and second planar surfaces of the arcuate plate, to establish a particular pattern that distinguishes the first surface of the plate from the second surface of the plate.

In one example, a thrust bearing assembly may include a main bearing and a thrust bearing. The thrust bearing assembly may be positioned at an interface of a crankshaft housing and a flywheel. The main bearing may include two semicircular half bearings coupled to each other and to the crankshaft housing via tabs housed in flange walls of the main bearing. A first tab housed in the upper half bearing may align with a second tab housed in the lower half bearing to ensure effective coupling of the two halves. The thrust bearing may be mounted on a surface of the lower half of the main bearing. The thrust bearing may include asymmetric holes to couple the bearing assembly to a flywheel housing via a poka-yoke feature.

In this manner, the use of asymmetric dowel holes on the thrust bearing assembly better ensures that that a thrust bearing is mounted with the correct surface facing the crankshaft. In particular, it may be ensured that the bearing can only be mounted in one direction. Further, the off-centered holes may be positioned on the bearing surface such that an incorrectly assembled thrust bearing is clearly visible to a technician, allowing for any mounting error to be rapidly identified and addressed. By relying on a simple poka-yoke feature, the thrust bearing assembly may be made easy to manufacture without relying on additional production and tooling costs.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF FIGURES

The present invention will be better understood from reading the following description of non-limiting embodiments, with reference to the attached drawings, wherein below:

DETAILED DESCRIPTION

Figure 1:
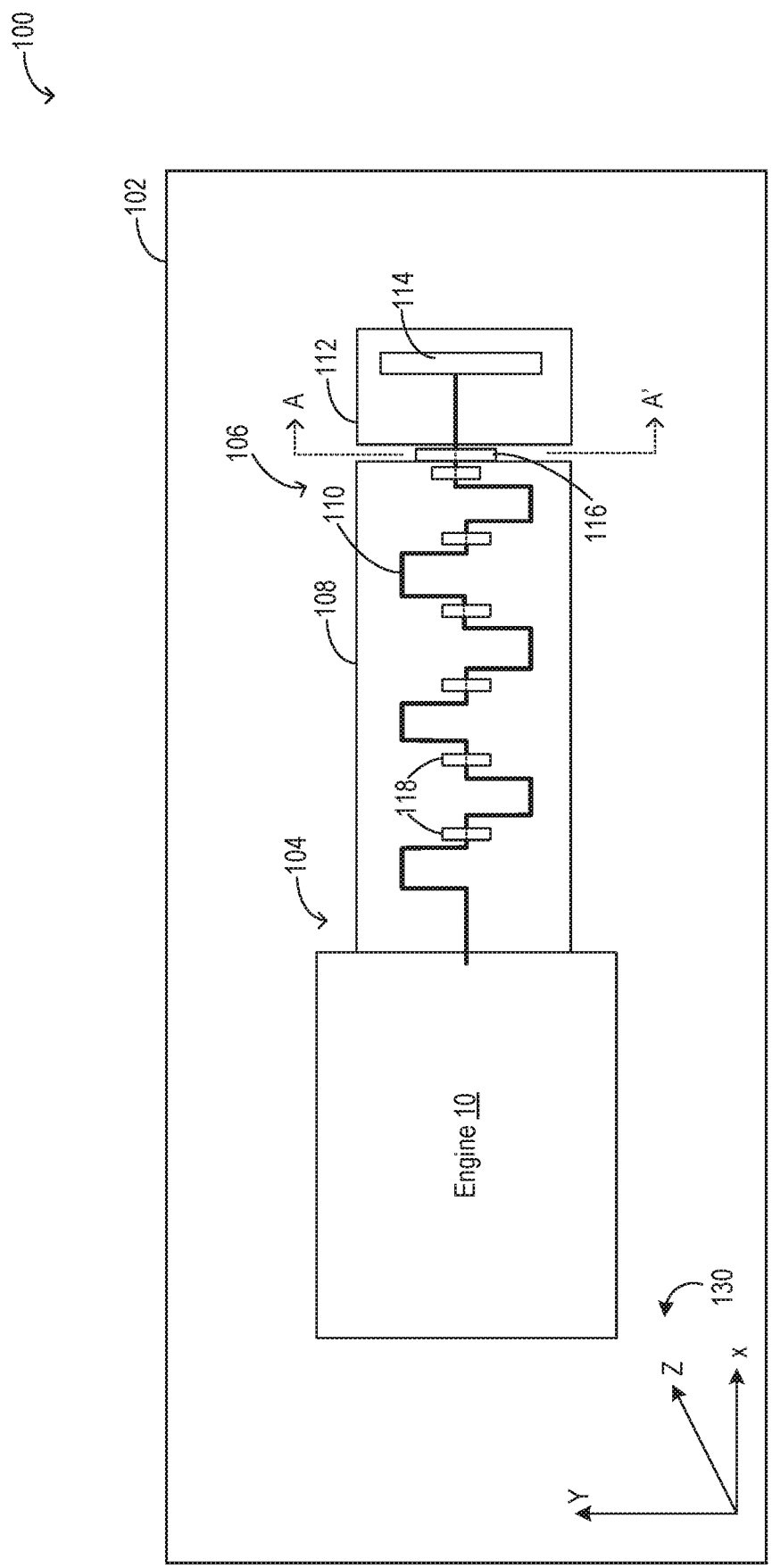
FIG. 1 shows an example embodiment of an engine system including a crankcase.

FIG. 1 is a block diagram of an example vehicle system 100. In the depicted example, the vehicle system is a locomotive configured to run on a track. Vehicle system 100 includes an internal combustion engine 10. Engine 10 includes one or more combustion chambers wherein air and fuel is burned to generate torque that enables vehicle propulsion. As depicted herein, in one example, the locomotive is a diesel electric vehicle operating a diesel engine 10 located within a main engine housing 102. However, in alternate embodiments of vehicle system 100, alternate engine configurations may be employed, such as a gasoline engine or a bio diesel or natural gas engine, for example.

Torque generated by fuel combustion in engine 10 is transferred to crankshaft 110 positioned in crankshaft housing 108 (also referred to herein as the crankshaft block). In particular, the crankshaft housing 108 is coupled to the engine at a front end 104 of the housing. The crankshaft 110 may extend out of the housing 108 at a rear end 106 of the housing. The protruding crankshaft at the rear end 106 of the housing is covered via flywheel covering 112. In the depicted example, flywheel covering 112 is hollow and included recesses for receiving the protruding end of the crankshaft, as well as for housing a flywheel 114. A (single) thrust bearing assembly 116 is provided at the interface of the crankshaft housing 108 and the flywheel covering 112. Specifically, the thrust bearing assembly 116 is provided at the rearmost end of the crankshaft housing. This allows the crankshaft 110 to be journaled into the crankshaft housing 108 and further into an engine block. The thrust bearing assembly 116 is made up of at least a main bearing and a thrust bearing, as described with reference to FIGS. 4-5. In addition to the thrust bearing assembly 116, one or more additional radial bearings 118 may be positioned along crankshaft housing 108 to journal the crankshaft 110. For example, additional radial bearings 118 may be positioned equidistantly along the length of the crankshaft housing. In one example, each of the radial bearings 118 may include an upper half bearing and a lower half bearing.

During operation of engine 10, loads on the crankshaft tend to force the crankshaft in axially opposite directions. The axial thrust may be significantly high during selected engine operating conditions, such as during periods of rapid acceleration and deceleration. Large axial thrusts can also be generated by the action of a torque converter in an engine transmission. This causes thrust loads to be imparted on the bearings. The thrust bearing is required to absorb such thrust forces to reduce engine damage and vibrations. Since the thrust bearing absorbs all the thrust force (relative to other radial bearings), the unit area pressure on the thrust bearing surface is high. By including a thrust bearing assembly at the end of the crankshaft furthest from the engine, the thrust force applied on the crankshaft can be better absorbed while enabling the crankshaft to remain seated and journaled on the crankshaft housing. In addition, sufficient oil film support can be provided at the bearing to maintain a desired separation between the crankshaft and the thrust bearing. A view of the crankshaft along axis A-A' (y-axis of the Cartesian coordinate system 130), when observed from the rearmost end of crankshaft housing, is described at FIG. 2.

Figure 2:
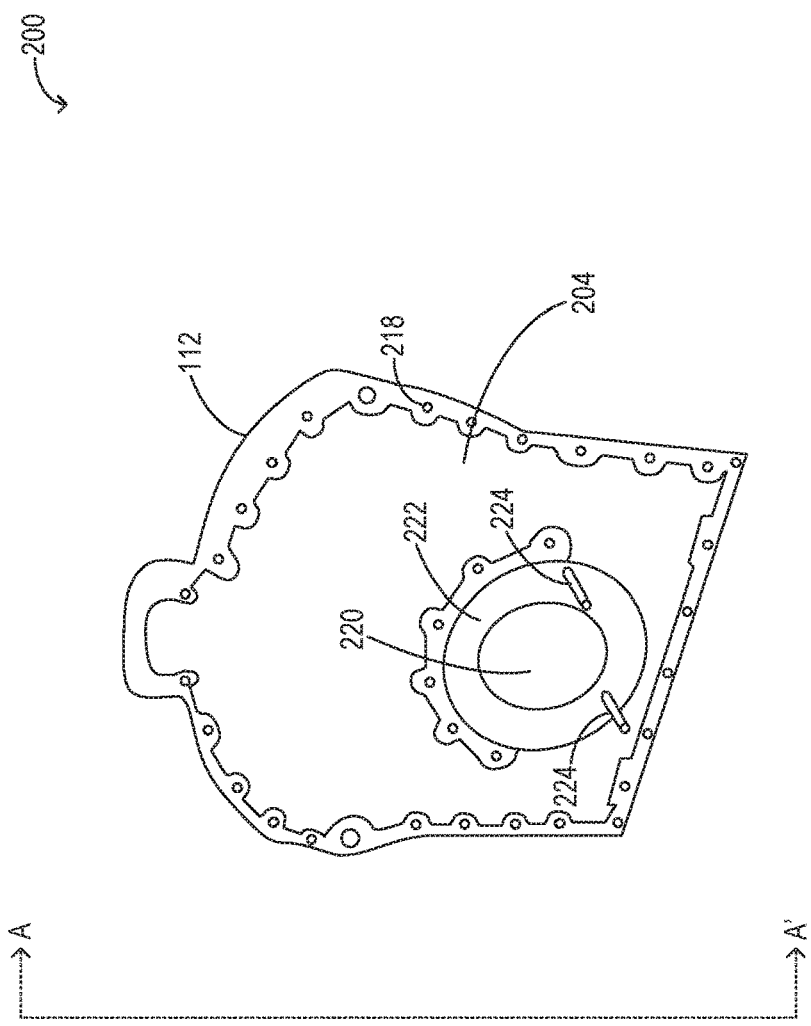
FIG. 2 shows a perspective view of a crankshaft and an associated thrust bearing assembly.
Figure 2:
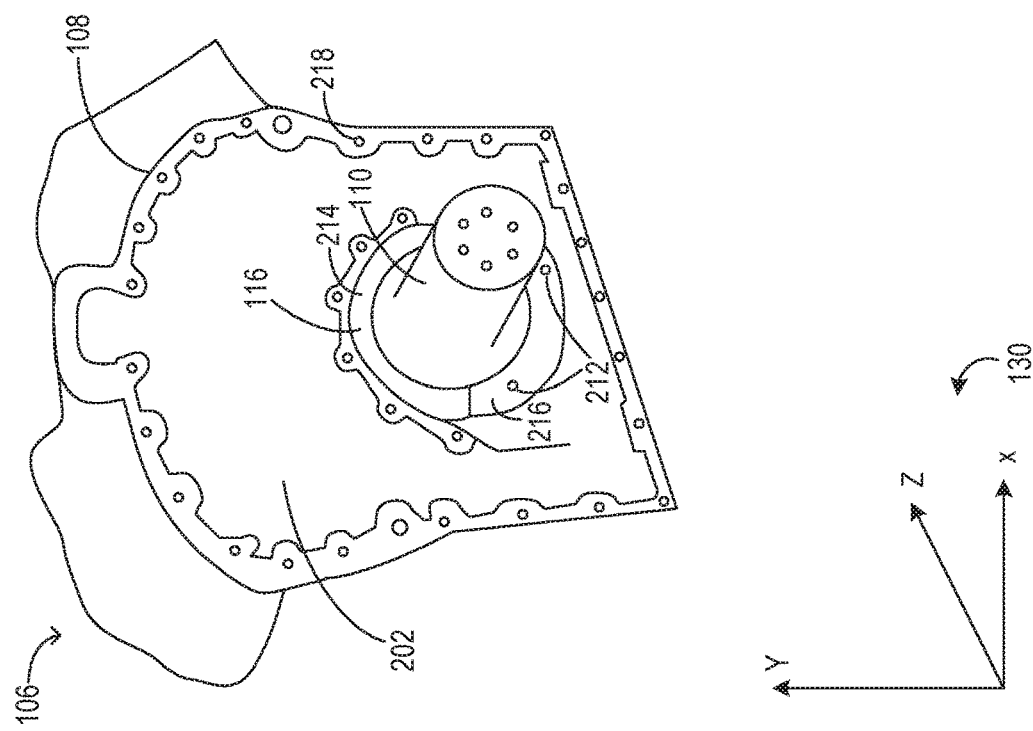

FIG. 2 shows a perspective view 200 of a crankshaft journaled in an engine block. The depicted view 200 shows the rear end of the engine housing with the crankshaft journaled on a thrust bearing assembly in an engine housing. In the view shown in FIG. 2, the crankshaft housing has been separated from the flywheel housing. Components previously introduced in FIG. 1 are numbered similarly and not reintroduced for brevity.

Perspective view 200 shows a face of the rear end 106 of crankshaft housing 108 with crankshaft 110 protruding out of it. While not shown, it will be appreciated that at the front end of the engine housing, the crankshaft is coupled to the engine and is configured to receive and transfer engine torque. View 200 also shows a face of the flywheel housing 112 with a recess 220 for receiving the crankshaft 110. Once mated, the flywheel housing covers the crankshaft end and the entire length of the crankshaft is contained and substantially no part of the crankshaft is exposed.

The crankshaft 110 protrudes out from the face of the crankshaft housing to mate into a recess 220 sized to receive the crankshaft. One or more threaded holes 218 may be provided along a periphery of the crankshaft housing 108 and flywheel housing 112 for coupling the two blocks. In particular, the threaded holes 218 may be positioned and sized such that when the crankshaft housing 108 is juxtaposed on the flywheel housing 112 with the crankshaft 110 inserted into recess 220, the threaded holes 218 on the crankshaft housing 108 line up with corresponding holes (that is, corresponding in size and position) on the flywheel housing 112 and the two can be mechanically bolted to each other via nuts, bolts, screws, or other fastening devices, and the crankshaft is securely mounted within a cavity defined by a combination of the crankshaft housing and the flywheel housing.

The crankshaft is journaled into crankshaft housing 108 through the use of one or more radial engine bearing assemblies positioned along a length of the crankshaft (see FIG. 1) and a single thrust bearing assembly 116 at the rear-most end 106 of the crankshaft housing. The thrust bearing assembly 116 includes a thrust bearing 216 positioned external to a main bearing 214. In order to maintain the axial load, the thrust bearing has to be mounted with a specified first surface facing the main bearing, and an opposite second surface facing the flywheel housing. This second surface is the surface of the thrust bearing that is visible upon mounting in the depicted view 200. A bearing 222, provided on the flywheel housing 112, lines up against the second surface of the thrust bearing 216 when the flywheel housing is connected to the crankshaft housing, with the crankshaft 110 inserted into recess 220.

Figure 4:
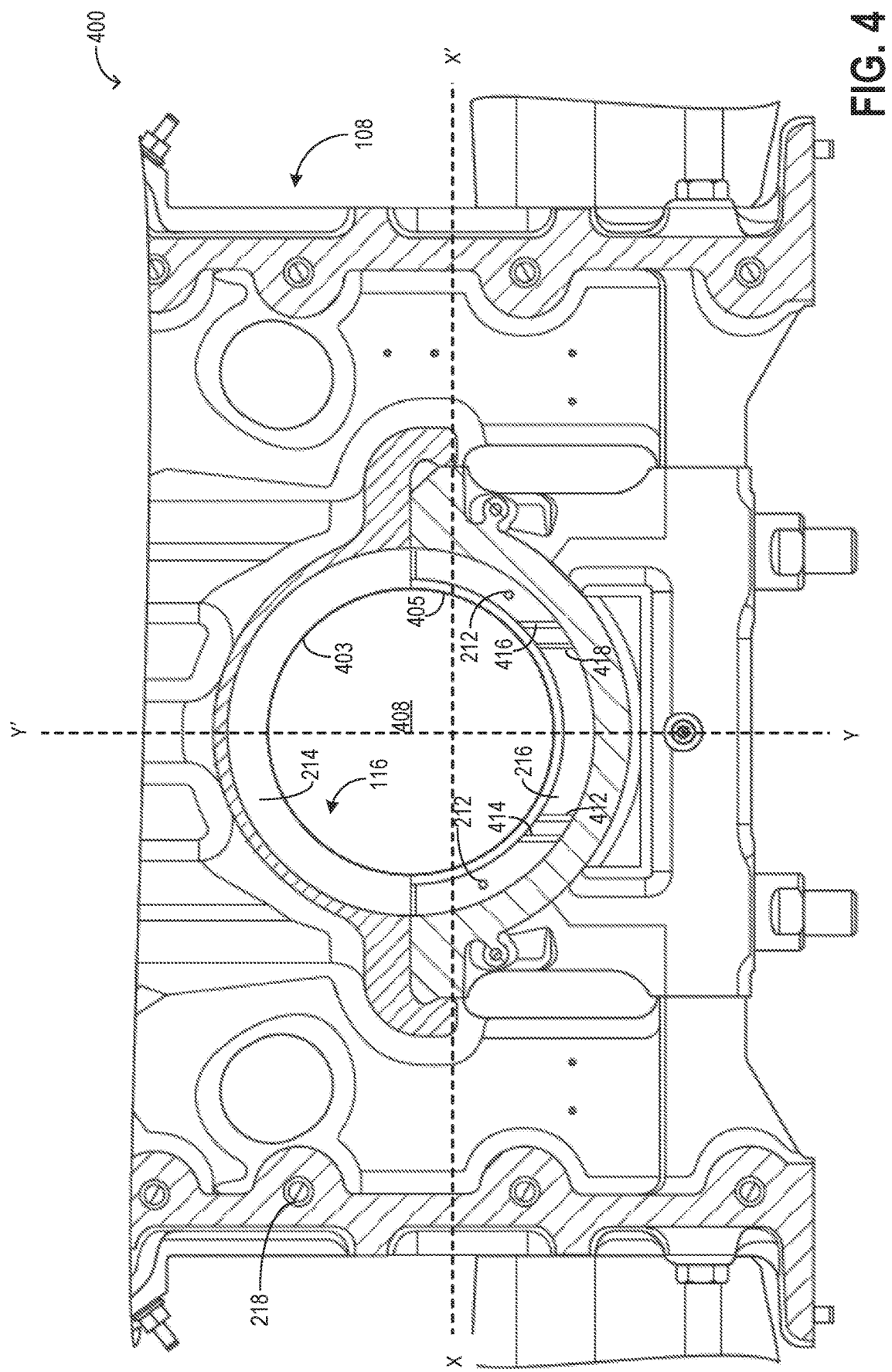
FIG. 4 shows a front view of the thrust bearing assembly when viewed from a crankshaft casing direction.

To ensure that the thrust bearing 216 is correctly mounted, as elaborated with reference to FIG. 4, the thrust bearing may be configured with a plurality of grooves and holes that, taken together, generate a particular pattern that distinguishes the first surface of the thrust bearing from the second surface. In the depicted view, holes 212 are visible. The holes and grooves on the thrust bearing are arranged such that when the thrust bearing is mounted correctly, an asymmetric arrangement of the holes is clearly visible to a service technician.

Figure 3:
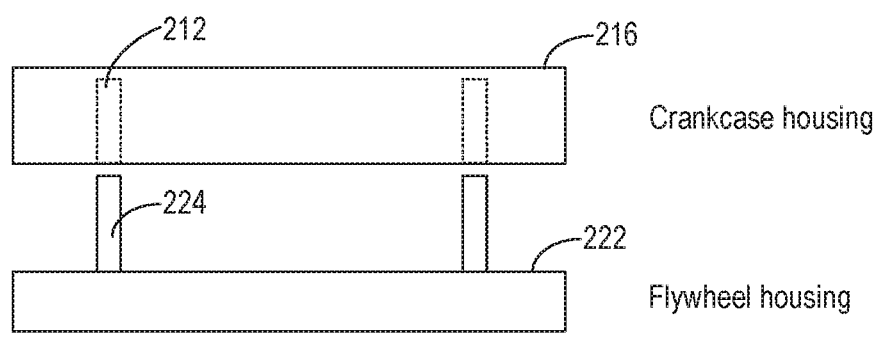
FIG. 3 shows a cross-sectional view of a thrust bearing of the bearing assembly with a poka-yoke feature coupled to a crankshaft casing.

The asymmetric arrangement of the holes may be such that holes 212 in the thrust bearing 216 can mate with a corresponding poka-yoke feature 224, also asymmetrically arranged, on bearing 222 of the flywheel housing 112. As a result of the correct mounting, the poka-yoke features 224 may align and couple with holes 212, as depicted in FIG. 3.

FIG. 4 shows a front view 400 of the thrust bearing assembly 116 when viewed from one end of the crankcase casing, in the direction of the crankshaft casing 108. In the view shown in FIG. 4, the crankshaft housing has been separated from the flywheel housing and the crankshaft has been removed. Components previously introduced in FIGS. 1 and 2 are numbered similarly and not reintroduced for brevity. Upon assembly of the crankshaft casing 108 with the flywheel housing, the threaded holes 218 on the crankshaft housing 108 may align with corresponding holes (that is, corresponding in size and position) on the flywheel housing and the two sets of holes may be mechanically bolted to each other via nuts, bolts, screws, or other fastening devices. Axis Y-Y' denotes the central longitudinal axis of the thrust bearing assembly 116 while axis X-X' denotes the central lateral axis of the thrust bearing assembly 116.

Cavity 408 in the center of the crankshaft casing 108 denotes the region through which the crankshaft passes. The thrust bearing assembly 116 includes a main radial bearing 214 encircling the cavity 408. In the presence of the crankshaft (within cavity 408), the main bearing 214 radially supports the crankshaft. The main bearing 214 may comprise a first semicircular half bearing 403 and a second semicircular half bearing 405. Each of the first semicircular half bearing 403 and a second semicircular half bearing 405 are arcuate including a concave inner surface and a convex outer surface. The radius of the first semicircular half bearing 403 (distance from the center of the cavity 408 to the concave edge of the semicircular half bearing 403) may be equal to the radius of the second semicircular half bearing 405 (distance from the center of the cavity 408 to the concave edge of the semicircular half bearing 405). As elaborated in relation to FIG. 5, in each of the first semicircular half bearing 403 and the second semicircular half bearing 405, the concave inner surface may include one or more tabs to mutually couple the two half bearings and also to couple the main bearing to the crankshaft casing 108. By locking the main bearing 214 to the crankshaft housing 108, rotation of the main bearing 214 may be averted.

The thrust bearing assembly 116 may include a thrust bearing 216 positioned external to the second semicircular half bearing 405 of the main bearing 214. The thrust bearing may be a semi-circular arcuate plate comprising two surfaces, a first surface facing the main bearing 214 and a second surface facing the flywheel (not shown here). The thrust bearing 216 may be positioned on the surface of the second semicircular half bearing 405 facing the flywheel. The thrust bearing 216 may include a concave inner edge, a convex outer edge, and two straight side edges. In one example, the arc length of the convex outer edge may be equal to that of the convex outer edge of the second semicircular half bearing 405 and the thrust bearing 216 may extend from a first interface where the second semicircular half bearing 405 meets the first semicircular half bearing 403 to a second interface where the second semicircular half bearing 405 meets the first semicircular half bearing 403. In another example, the arc length of the convex outer edge may be shorter than that of the convex outer edge of the second semicircular half bearing 405. The thrust bearing 216 may be of uniform thickness and may include one or more tabs along the lengths of the two straight edges. The tabs may facilitate in mounting the thrust bearing 216 on the second semicircular half bearing 405 of the main bearing 214. In one example, thickness of the thrust bearing 216 may be 4.47 mm.

A plurality of oil groves 412, 414, 416, and 418 may be etched on the second surface of the thrust bearing 216. The oil groves 412, 414, 416, and 418 may not extend to the first surface of the thrust bearing 216. In this example, the oil groves are symmetrically distributed around the central longitudinal Y-Y' axis with two groves 412 and 414 (first set of groves) on a first side of the thrust bearing 216 (on a first side of the Y-Y' axis) and the remaining two groves 416 and 418 (second set of groves) on a second side of the thrust bearing (on a second side of the Y-Y' axis), the second side of the thrust bearing opposite to the first side. In this example, the oil groves are parallel to each other. In alternate examples, the oil groves may be differently distributed and may be transverse to each other. In one example, the thickness and depth of each oil grove may be 10 mm and 1.45 mm respectively. The oil grooves 412, 414, 416, and 418 channel a lubricant (not shown) for developing a protective hydrodynamic oil film across the face of the thrust bearing 216 during crankshaft operation, to reduce friction and wear.

A pair of holes 212 are formed on the thrust bearing to enable coupling of the thrust bearing assembly 116 to the flywheel via a poka-yoke feature. Relative to the central longitudinal Y-Y' axis, the two holes 212 are positioned asymmetrically. A first of the at least two holes is positioned closer to the first set of parallel grooves (414 and 414) on the first side of the thrust bearing 216, and wherein a second of the at least two holes is positioned further from the second set of parallel grooves (416 and 418) on a second, opposite side of the thrust bearing 216.

By positioning the holes 212 in an asymmetric manner, during assembly, it may be ensured that the thrust bearing is mounted on the second surface of the main bearing. If the thrust bearing is incorrectly assembled, due to the presence of the asymmetric holes, a technician would be able to identify and rectify the error at the manufacturing site.

In this way, the arrangement of the two holes 212 relative to the central longitudinal Y-Y' axis and relative to the plurality of grooves 412, 414, 416, and 418 distinguishes the one face of the arcuate plate of the thrust bearing from another opposite face of the arcuate plate.

In this way, the components of FIG. 4 enable a thrust bearing assembly for a crankshaft, comprising: a main radial bearing including a pair of semicircular half bearings, each with a concave inner surface, a convex outer surface, and a pair of flange walls extending from the convex surface, the radial bearing configured to encircle a crankshaft in a crankshaft housing; and a thrust bearing including a semicircular plate with a concave inner edge, a convex outer edge extending radially from the inner edge to form a thrust surface, a pair of asymmetrically positioned holes along the thrust surface, and parallel grooves on one face of the plate.

Figure 5:
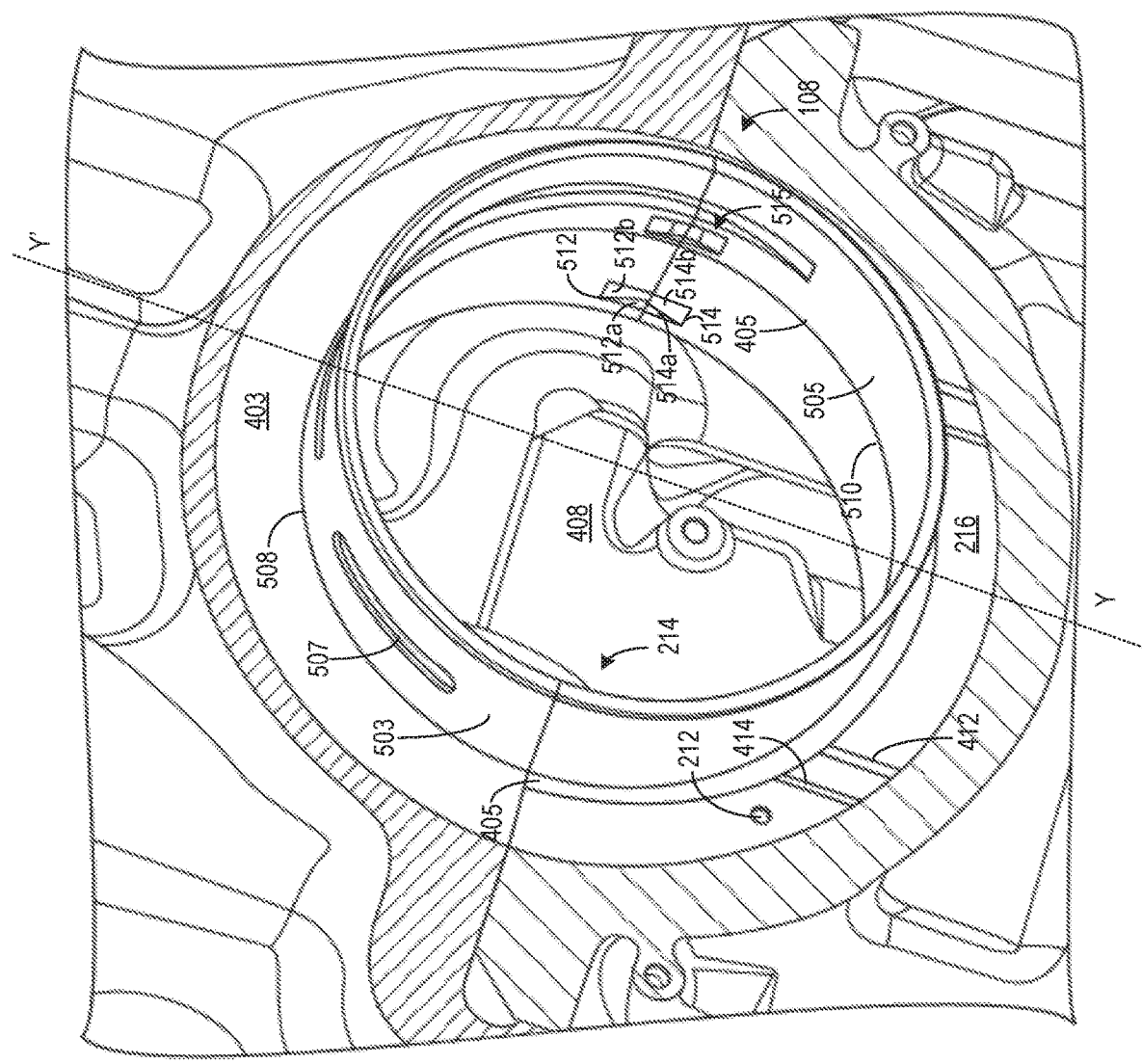
FIG. 5 shows an exploded view of the thrust bearing assembly including a main bearing assembly with alignment tabs.

FIG. 5 shows an exploded view 500 of the thrust bearing assembly 116 including a main bearing 214. In this view, an inner shell of the main bearing has been projected outside of the thrust bearing assembly for better understanding of the interlocking mechanism of the main bearing 214 and the crankshaft casing 108. Components already introduced in previous figures are numbered similarly and not reintroduced for brevity.

The main bearing 214 may comprise a first semicircular half bearing 403 and a second semicircular half bearing 405. Each of the first semicircular half bearing 403 and the second semicircular half bearing 405 are arcuate including a concave inner surface and a convex outer surface. A first flange wall 503 (also refereed herein as first flange) may radially extend from the edge of the convex surface 508 of the first semicircular half bearing 403 while a second flange wall 505 (also refereed herein as second flange) may radially extend from the edge of the convex surface 510 of the second semicircular half bearing 405. Each of the flange walls 503 and 505 may be arcuate bearing shells with a concave inner surface and a convex outer surface. In this exploded view, the flange walls 503 and 505 are shown to be protruding out of the thrust bearing assembly 116, however, upon assembly, the flange walls 503 and 505 extend radially inwards (away from the face of the main bearing in contact with the flywheel housing) and encircle the crankshaft positioned within the cavity 408. The flange walls 503 and 505 may include one or more openings 507 to improve alignment of the flanges with the crankshaft casing 108. The width and thickness of the flange wall 503 may be equal o that of the flange wall 505. In one example, the width of the flange walls 503 and 505 may be 53 mm.

As previously described in relation to FIG. 4, a thrust bearing 216 may be mounted external to the second semicircular half bearing 405 of the main bearing 214. The thrust bearing 216 may include a plurality of holes 212 to facilitate mating with a poka-yoke feature on the flywheel. Further, the surface on the thrust bearing 216 that is not in contact with the main bearing 214 may include a plurality of grooves 412 and 414 to channel lubricant across the face of the thrust bearing 216 during crankshaft operation.

The flange walls 503 and 505 may include alignments tabs (also referred herein as tabs) such that the first semicircular half bearing 403 and a second semicircular half bearing 405 may be mutually coupled, and the main bearing 214 may be coupled to the crankshaft casing 108. A first alignment tab 512 may be positioned on the flange wall 503 while a second alignment tab 514 may be positioned on the flange wall 505. Each of the two alignment tabs 512 and 514 may be positioned at an interface of the first flange wall 503 and the second flange wall 505 such that upon aligning the first semicircular half bearing 403 and the second semicircular half bearing 405, the first alignment tab 512 and the second alignment tab 514 abuts one another. Said another way, upon juxtaposition of the first semicircular half bearing 403 and the second semicircular half bearing 405, the first alignment tab 512 may align with the second alignment tab 514. If during assembly, the first semicircular half bearing is positioned in place of the second semicircular half bearing, the tabs will not align (not be adjacent), thereby making it obvious to a technician that the assembly has been erroneous (which can then be rectified). In this way, the tab positioning enables a unique assembly of the two semicircular half bearings.

The first alignment tab 512 includes a first triangular prism 512a with a right angled surface and a first sloped surface 512b and the second alignment tab 514 includes a second triangular prism 514a with a right angled surface and a second sloped surface 514b. Upon aligning of the first semicircular half bearing 403 and the second semicircular half bearing 405, the alignment tab from each half bearing may be juxtaposed next to each other such that the right angled surface of each half bearing abuts one another, and the sloped surface of each half bearing slopes away from one another. The tabs 512 and 514 also couple each of the first semicircular half bearing 403 and the second semicircular half bearing 405 to the crankshaft housing 108. Once the first semicircular half bearing 403 and the second semicircular half bearing 405 are attached to each other and to the crankshaft housing 108, the tab assembly 155 comprising tabs 512 and 514 may hold the main bearing 414 in position encircling the crankshaft.

In this way, the components of FIG. 5 enable a starter system, comprising: a thrust bearing assembly for a crankshaft, comprising: a radial bearing including a pair of semicircular half bearings, each with a concave inner surface, a convex outer surface, an alignment tab on the inner surface, and a pair of flange walls extending from the convex surface, the pair of half bearings configured to encircle an outer surface of the crankshaft, journaled within a crankcase, via aligning of the alignment tab, and a thrust bearing supporting a lower surface of the crankshaft, the thrust bearing including a semi-circular plate with a concave inner edge abutting the lower surface of the crankshaft, a convex outer edge extending radially from the inner edge to form a thrust surface, parallel grooves formed on the plate, and a pair of alignment holes positioned asymmetrically along the thrust surface relative to the parallel grooves.

Figure 6A:
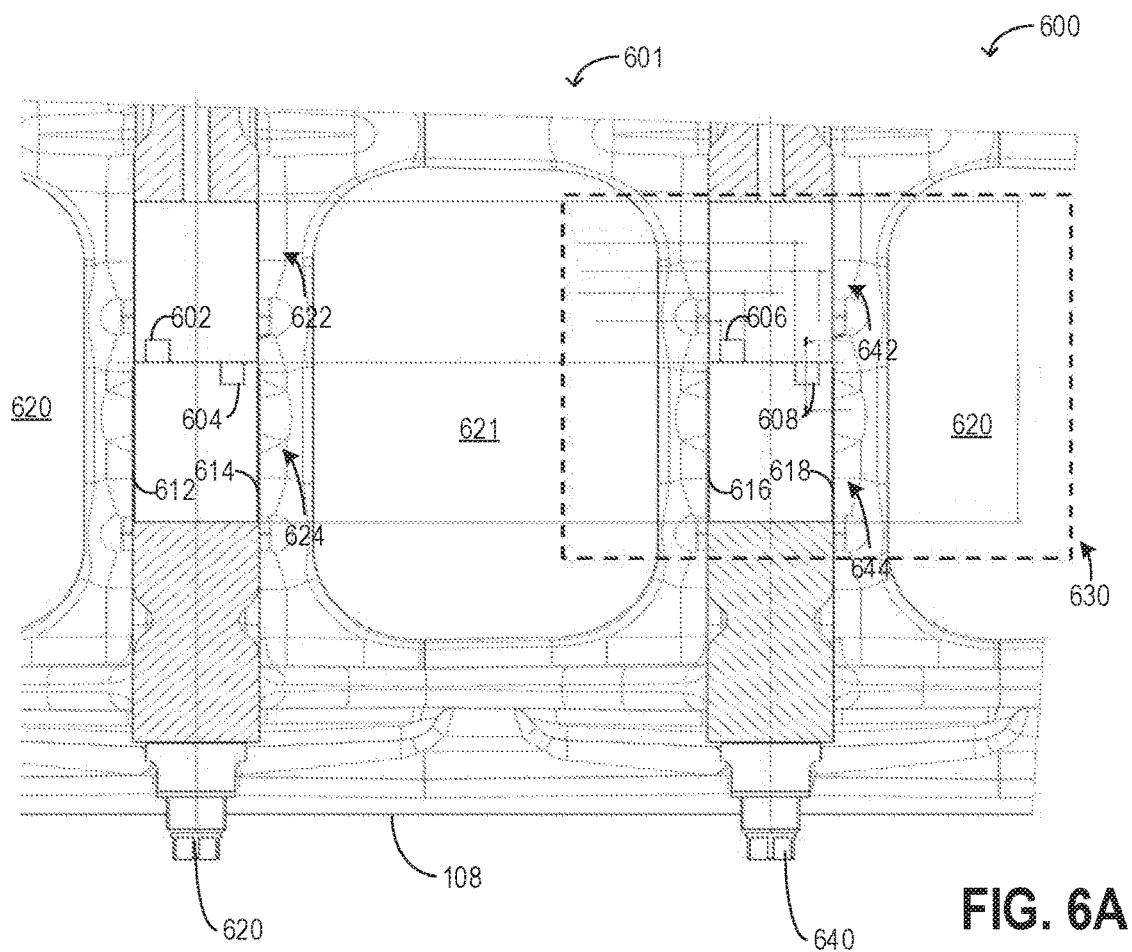
FIG. 6A shows a cross sectional view of the bearing assembly including a first example alignment tab arrangement.

FIG. 6A shows a cross sectional view 600 of the bearing assembly 601 including a first example alignment tab arrangement. As seen in FIG. 6A, the bearing assembly may be visible through the thrust bearing and the main bearing in the direction of the main engine housing. In one example, the cross sectional view 600 may be a cross section of the crankshaft housing 108 (as seen in FIG. 1) along the X-Y plane.

One or more radial bearings 118 may be positioned along crankshaft housing 108 to journal the crankshaft passing through the cavity 621. The radial bearings 118 may be positioned equidistantly along the length of the crankshaft housing. In FIG. 6A, two such radial bearings 620 and 640 are shown. The first radial bearing 620 may comprise an upper half bearing 622 and a lower half bearing 624. The two half bearings 622 and 624 may be joined via tabs 602 and 604. In the first example of alignment tab arrangement, a first tab 602 coupled to the upper half bearing 622 may be positioned at a first edge of the upper half bearing 622, proximal to a left wall 612 of the upper half bearing 622 while a second tab 604 coupled to the lower half bearing 624 may be positioned at a second edge of the lower half bearing 624 proximal to a right wall 614 of the lower half bearing 624. Upon coupling of the upper half bearing 622 with the lower half bearing 624, the first edge of the upper half bearing 622 abuts the second edge of the lower half bearing 624. Similarly, the second radial bearing 640 may comprise an upper half bearing 642 and a lower half bearing 644. The two half bearings 642 and 644 may be joined via tabs 606 and 606. In the first example of alignment tab arrangement, a first tab 606 coupled to the upper half bearing 642 may be positioned at a first edge of the upper half bearing 642, proximal to a left wall 616 of the upper half bearing 642 while a second tab 608 coupled to the lower half bearing 644 may be positioned at a second edge of the lower half bearing 644 proximal to a right wall 618 of the lower half bearing 644. Upon coupling of the upper half bearing 642 with the lower half bearing 644, the first edge of the upper half bearing 642 abuts the second edge of the lower half bearing 644.

However, during assembly of the radial bearings, if the lower half bearing is erroneously swapped with the upper half bearing, based on the alignment of the tabs (after the assembly), it would not be visible to the technician. Such inaccurate assembly may cause increased stress on the bearings, thereby causing degradation. In order to avert any possibilities of erroneous assembly, the tabs may be positioned differently on the flange walls.

Figure 6B:
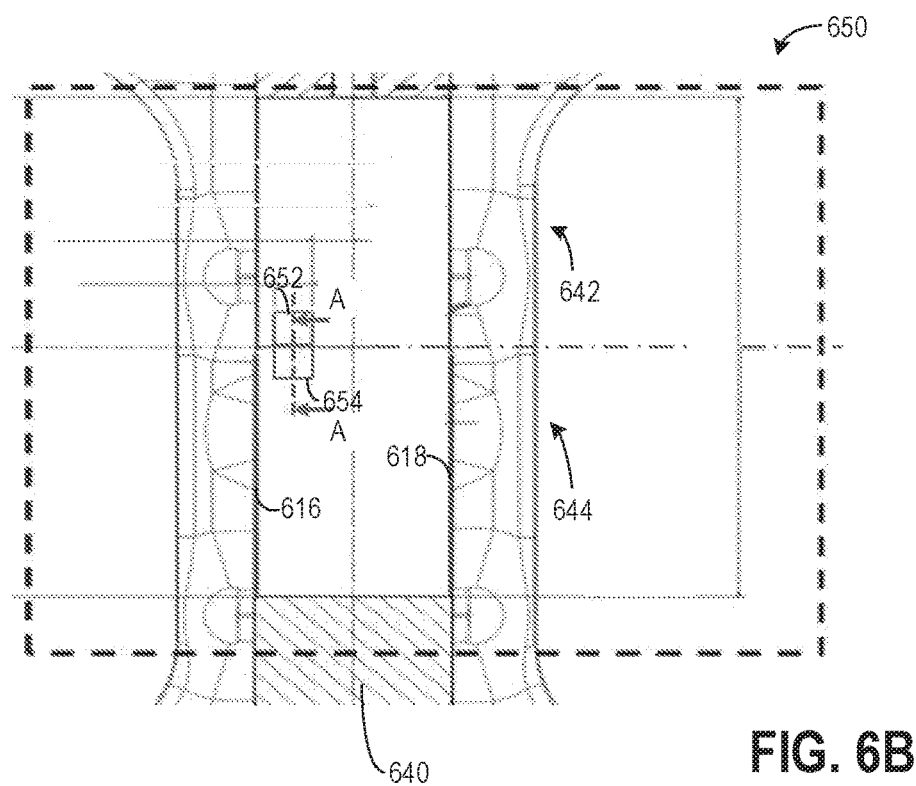
FIG. 6B shows a cross sectional view of the bearing assembly including a second example alignment tab arrangement.

FIG. 6B shows a cross sectional view 650 of the bearing assembly 601 including a second example alignment tab arrangement. As an example, cross sectional view 650 may be the window 630 as seen in FIG. 6A. In this tab arrangement, a first tab 652 coupled to an upper half bearing 642 (of radial bearing 640) may be positioned at a first edge of the upper half bearing 622, proximal to a left wall 615 of the upper half bearing 652. While, a second tab 654 coupled to a lower half bearing 644 (of radial bearing 640) may be positioned at a second edge of the lower half bearing 624, also proximal to the left wall 615. Upon juxtaposition of the first semicircular half bearing 642 and the second semicircular half bearing 644, the first tab 652 may align with the second tab 654. If during assembly, the first semicircular half bearing is positioned in place of the second semicircular half bearing, the tabs will not align, thereby making it obvious to a technician that the assembly has been erroneous (which can then be rectified). In this way, by positioning the two tabs 652 and 654 proximal to the same wall 616, manufacturing errors for a bearing assembly 601 may be reduced.

In this way, by using asymmetric holes in the thrust bearing, possibility of incorrectly attaching the thrust bearing to the main bearing may be reduced. Due to the orientation of the holes, an erroneously mounted thrust plate may be identified at the manufacturing facility and may be rectified. Also, by aligning the tabs on the two half bearings of a main bearing, the half bearings may be installed in a single arrangement, thereby reducing the possibility of manufacturing errors.

A thrust bearing comprises: an arcuate plate having a concave inner edge and a convex outer edge extending radially from the inner edge to form a thrust surface, at least two holes in the plate positioned asymmetrically with reference to a central axis of the arcuate plate, a plurality of parallel grooves formed on one face of the arcuate plate. In any preceding example, additionally or optionally, the plurality of parallel grooves are arranged symmetrically with reference to the central axis of the arcuate plate. In any or all of the preceding examples, the circuit further comprising, additionally or optionally, a first of the at least two holes is positioned closer to a first set of parallel grooves on a first side of the central axis, and wherein a second of the at least two holes is positioned further from a second set of parallel grooves on a second, opposite side of the central axis. In any or all of the preceding examples, additionally or optionally, an arrangement of the at least two holes relative to the central axis and relative to the plurality of grooves distinguishes the one face of the arcuate plate from another opposite face of the arcuate plate. In any or all of the preceding examples, additionally or optionally, the bearing is mounted on a rear end of a crankshaft at a location where the crankshaft is journaled within a crankcase housing. In any or all of the preceding examples, additionally or optionally, the thrust bearing, when mounted, abuts a main bearing coupled to the crankshaft. In any or all of the preceding examples, the circuit further comprising, additionally or optionally, when the thrust bearing is mounted, the first set of parallel grooves are not in contact with the main bearing. In any or all of the preceding examples, further comprising, additionally or optionally, a flange extending from the convex outer edge, in a radial direction, away from the one face of the arcuate plate, the flange abutting the main bearing. In any or all of the preceding examples, additionally or optionally, the bearing is mounted on a lower surface of the crankcase, and wherein the mounted thrust bearing abuts one half bearing of the main bearing. In any or all of the preceding examples, additionally or optionally, the at least two holes are configured to mate with an alignment feature arranged on a crankcase cover.

Another example thrust bearing assembly for a crankshaft, comprises: a main radial bearing including a pair of semicircular half bearings, each with a concave inner surface, a convex outer surface, and a pair of flange walls extending from the convex surface, the radial bearing configured to encircle a crankshaft in a crankshaft housing, and a thrust bearing including a semi-circular plate with a concave inner edge, a convex outer edge extending radially from the inner edge to form a thrust surface, a pair of asymmetrically positioned holes along the thrust surface, and parallel grooves on one face of the plate. In any preceding example, additionally or optionally, the thrust bearing is coupled to a lower surface of the crankshaft. In any or all of the preceding examples, additionally or optionally, the pair of asymmetrically positioned holes are positioned at different distances and different heights relative to a central axis of the bearing assembly, the central axis running along a length of the crankshaft. In any or all of the preceding examples, additionally or optionally, the parallel grooves are formed on one face of the arcuate plate, and are arranged at equal distance and equal heights relative to the central axis such that a first hole of the pair of asymmetrically positioned holes is closer to the parallel grooves along the thrust surface while a second hole of the pair is further from the parallel grooves along the thrust surface. In any or all of the preceding examples, additionally or optionally, an arrangement of the asymmetrically positioned holes relative to the parallel grooves distinguishes a front face of the thrust bearing from a back face of the bearing. In any or all of the preceding examples, additionally or optionally, each half bearing of the main bearing has an orientation tab on the concave inner surface, and wherein the main radial bearing is mounted on the crankshaft by aligning with the orientation tab of a first of the pair of half bearings with the orientation tab of a remaining of the pair.

In yet another example, a thrust bearing assembly for a crankshaft, comprises: a radial bearing including a pair of semicircular half bearings, each with a concave inner surface, a convex outer surface, an alignment tab on the inner surface, and a pair of flange walls extending from the convex surface, the pair of half bearings configured to encircle an outer surface of the crankshaft, journaled within a crankcase, via aligning of the alignment tab, and a thrust bearing supporting a lower surface of the crankshaft, the thrust bearing including a semi-circular plate with a concave inner edge abutting the lower surface of the crankshaft, a convex outer edge extending radially from the inner edge to form a thrust surface, parallel grooves formed on the plate, and a pair of alignment holes positioned asymmetrically along the thrust surface relative to the parallel grooves. In any preceding example, additionally or optionally, the asymmetrically positioned holes and the parallel grooves define a first face of the thrust bearing, a second face of the thrust bearing, opposite the first face, in face sharing contact with the flange wall of a lower of the pair of half bearings. In any or all of the preceding examples, additionally or optionally, the first face of the thrust bearing is configured to be in face-sharing contact with a crankcase cover having a bearing with a poka-yoke feature, the thrust bearing aligned so that a protrusion of the poka-yoke feature mates with the asymmetrically positioned alignment holes. In any or all of the preceding examples, additionally or optionally, the alignment tab is configured as a triangular prism with a right angled surface and a sloped surface, and wherein when the pair of half bearings are aligned, the alignment tab from each half bearing is juxtaposed next to each other such that the right angled surface of each half bearing abuts one another, and the sloped surface of each half bearing slopes away from one another.

This written description uses examples to disclose the invention, and to enable one of ordinary skill in the relevant art to practice embodiments of the invention, including making and using the devices or systems and performing the methods. The patentable scope of the invention is defined by the claims, and may include other examples that occur to one of ordinary skill in the relevant art. Such other examples are intended to be within the scope of the claims if they have structural elements that do not differ from the literal language of the claims, or if they include equivalent structural elements with insubstantial differences from the language of the claims.

The invention claimed is:
1. A thrust bearing, comprising:
an arcuate plate having a concave inner edge and a convex outer edge extending radially from the inner edge to form a thrust surface;
at least two holes in the plate positioned asymmetrically with reference to a central axis of the arcuate plate;
a plurality of parallel grooves formed on one face of the arcuate plate.
2. The bearing of claim 1, wherein the plurality of parallel grooves is arranged symmetrically with reference to the central axis of the arcuate plate.
3. The bearing of claim 1, wherein a first of the at least two holes is positioned closer to a first set of the parallel grooves on a first side of the central axis, and wherein a second of the at least two holes is positioned further from a second set of the parallel grooves on a second, opposite side of the central axis.

4. The bearing of claim 3, wherein an arrangement of the at least two holes relative to the central axis and relative to the plurality of grooves distinguishes the one face of the arcuate plate from another, opposite face of the arcuate plate.

5. A system comprising the bearing of claim 4, wherein the bearing is mounted on a rear end of a crankshaft at a location where the crankshaft is journaled within a crankcase housing.

6. The system of claim 5, wherein the bearing abuts a main bearing coupled to the crankshaft.

7. The system of claim 6, wherein the first set of parallel grooves are not in contact with the main bearing.

8. The system of claim 6, further comprising a flange extending from the convex outer edge, in a radial direction, away from the one face of the arcuate plate, the flange abutting the main bearing.

9. The system of claim 6, wherein the bearing is mounted on a lower surface of the crankcase housing, and wherein the mounted bearing abuts one half bearing of the main bearing.

10. The bearing of claim 1, wherein upon mounting, the at least two holes are configured to mate with an alignment feature arranged on a crankcase cover.

11. A thrust bearing assembly, comprising:
a main radial bearing including a pair of semicircular half bearings, each with a concave inner surface, a convex outer surface, and a pair of flange walls extending from the convex surface, the radial bearing configured to encircle a crankshaft in a crankshaft housing; and
a thrust bearing including a semi-circular plate with a concave inner edge, a convex outer edge extending radially from the inner edge to form a thrust surface, a pair of holes positioned asymmetrically with reference to a central axis along the thrust surface, and parallel grooves on one face of the plate.

12. A system comprising the assembly of claim 11, wherein the thrust bearing is coupled to a lower surface of the crankshaft.

13. A system comprising the assembly of claim 11, wherein the pair of asymmetrically positioned holes are positioned at different distances and different heights relative to a central axis of the bearing assembly, the central axis running along a length of the crankshaft.

14. The system of claim 13, wherein the parallel grooves are selectively formed on one face of the arcuate plate, and are arranged at equal distance and equal heights relative to the central axis such that a first hole of the pair of asymmetrically positioned holes is closer to the parallel grooves along the thrust surface while a second hole of the pair is further from the parallel grooves along the thrust surface.

15. The system of claim 14, wherein an arrangement of the asymmetrically positioned holes relative to the parallel grooves distinguishes a front face of the thrust bearing from a back face of the thrust bearing.

16. A system comprising the assembly of claim 11, wherein each half bearing of the main radial bearing has an orientation tab on the concave inner surface, and wherein the main radial bearing is mounted on the crankshaft by aligning with the orientation tab of a first of the pair of half bearings with the orientation tab of a remaining of the pair.

17. A thrust bearing assembly for a crankshaft, comprising:
a radial bearing including a pair of semicircular half bearings, each with a respective concave inner surface, a convex outer surface, an alignment tab on the inner surface, and a flange wall extending from the convex surface, the pair of half bearings configured to encircle an outer surface of the crankshaft, journaled within a crankcase, via aligning of the alignment tabs; and
a thrust bearing supporting a lower surface of the crankshaft, the thrust bearing including a semi-circular plate with a concave inner edge abutting the lower surface of the crankshaft, a convex outer edge extending radially from the inner edge to form a thrust surface, parallel grooves formed on the plate, and a pair of alignment holes positioned asymmetrically along the thrust surface relative to the parallel grooves.

18. The system of claim 17, wherein the asymmetrically positioned holes and the parallel grooves define a first face of the thrust bearing, a second face of the thrust bearing, opposite the first face, in face sharing contact with the flange wall of a lower of the pair of half bearings.

19. The system of claim 17, wherein the first face of the thrust bearing is configured to be in face-sharing contact with a crankcase cover having a bearing with a poka-yoke feature, the thrust bearing aligned so that a protrusion of the poka-yoke feature mates with the asymmetrically positioned alignment holes.

20. The system of claim 17, wherein the alignment tab is configured as a triangular prism with a right angled surface and a sloped surface, and wherein when the pair of half bearings are aligned, the alignment tab from each half bearing is juxtaposed next to each other such that the right angled surface of each half bearing abuts one another, and the sloped surface of each half bearing slopes away from one another.

* * * * *